UNITED STATES PATENT OFFICE 2,068,905

PROCESS FOR PREPARING ETHER ACIDS

Herman A. Bruson, Germantown, Pa., assignor to The Resinous Products & Chemical Company, Philadelphia, Pa.

No Drawing. Application January 6, 1936, Serial No. 57,731

6 Claims. (Cl. 260—112)

This invention relates to a process for preparing ether acids from alcohols and esters of halogenated carboxylic acids. It is an object of this invention to provide a process for preparing ether acids by a cheaper and less hazardous method than has heretofore been available.

Ether acids have been prepared from carboxylic acids or their esters containing a labile halogen atom by treatment with sodium alcoholates or barium alcoholates. These alcoholates are prepared either from metallic sodium or from barium oxide. The high cost of barium oxide renders its use practically prohibitive on a commercial scale and necessitates recovery of the barium whereas the employment of metallic sodium although cheaper involves considerable danger not only in the handling and storing of the metal but also in controlling the violently exothermic reaction which evolves hydrogen in large amounts and which can lead to serious explosions.

Attempts made to alleviate this condition by preparing the alkali metal alcoholates from the alcohol and caustic soda or caustic potash failed. Poor yields of ether acids were obtained due to the difficulty of obtaining complete conversion of the alcohol and caustic alkali to the alcoholates. The extent of conversion fell progressively as the molecular weight of the alcohol increased. For example, the conversion of octanol-2 (capryl alcohol) to sodium octylate-2 by treatment with caustic soda at temperatures up to 180° C. was only about 10 per cent. and above this temperature considerable quantities of dicapryl alcohol and tricapryl alcohol were formed.

I have found, however, that excellent yields of ether acids, especially of the higher aliphatic ether acids, can be readily obtained without the attendant dangers of handling sodium and at a low cost of operation by suspending sodium oxide (Na$_2$O) in the alcohol and after a short heat treatment condensing the reaction product with a neutral ester of a halocarboxylic acid. The low cost of sodium oxide and the ease of control of the reaction render the process commercially feasible. In place of sodium oxide potassium oxide may be used.

Upon mixing sodium oxide with an excess of the alcohol which is to be employed a quiet exothermic reaction occurs according to the following equation:

(1) $ROH + Na_2O \rightarrow RONa + NaOH$

The free caustic soda remains in suspension whereas the sodium alcoholate dissolves in the excess alcohol. Upon adding the halo acid ester, sodium chloride splits out and the ester of the ether acid is formed according to the following equation:

(2) $RONa + ClC_nH_{2n}COOR \rightarrow$
$R-O-C_nH_{2n}COOR + NaCl$

Upon boiling the reaction product with water or on steam-distilling off the excess alcohol, this ester is saponified by the NaOH.

(3) $R-O-C_nH_{2n}COOR + NaOH \rightarrow$
$R-O-C_nH_{2n}-COONa + ROH$

The free acid is then liberated by the addition of dilute mineral acid and isolated in the usual manner by extraction and distillation.

The reaction is generally applicable to all neutral alcohols which are capable of forming stable alkali metal alcoholates. The alcohols can be aliphatic, aromatic, alicyclic or heterocyclic in character and may be monohydric or polyhydric. They may contain additional oxygen or sulfur atoms in an ether linkage.

Examples of organic acids containing a labile halogen atom, the neutral esters of which are suitable for the purposes of the present invention, are the chloro- or bromo-carboxylic or polycarboxylic acids of the aliphatic series such as chloracetic, α- or β-chlorpropionic, the chlorbutyric or chlor-isobutyric acids and their homologues or the corresponding bromo-derivatives, chloro-succinic acid, chlorlauric acid, higher chlorinated aliphatic acids and the like.

The reaction is applicable to the lower as well as the higher alcohols and in the case of the higher alcohols, sodium oxide has the distinct advantage over metallic sodium in that it requires only a fraction of the time to form the alcoholate at a much lower reaction temperature.

EXAMPLE 1

*Capryloxyacetic acid*

$$CH_3-CH_2-CH_2-CH_2-CH_2-CH_2-\overset{\overset{\displaystyle CH_3}{|}}{CH}-O-CH_2-COOH$$

37 grams of powdered sodium oxide were added to 400 grams of pure dry capryl alcohol (octanol-2) which was agitated in a vessel equipped with a reflux condenser, thermometer and rapid stirrer. The temperature rose spontaneously to about 85° C. The mixture was then heated as rapidly as possible to 130° C. and held at 130° C. for 1 hour. During this time sodium octylate-2 was formed almost quantitatively together with free caustic soda which remained suspended in the liquid. The suspension was allowed to cool to about 70° C. and then 103 grams pure dry capryl mono-chloracetate ClCH₂COOC₈H₁₇ were added. The temperature rose to 110–115° C. and the mixture was constantly agitated until the reaction was completed. Steam was then blown through the hot mixture to recover the capryl alcohol. The clear, reddish solution remaining in the still was then acidified with aqueous 10 per cent. sulfuric acid. The crude capryloxyacetic acid separated as a reddish oil weighing 97 grams. When distilled in vacuo it yielded 80 grams of pure, water-white capryloxyacetic acid boiling at 133–137° C./2 mm. Yield is 85 per cent. of theory.

Example 2

*Ethylhexyloxyacetic acid*

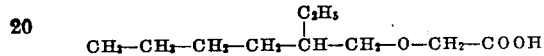

Using the same procedure as in Example 1, 400 grams of technical α-ethylhexanol when heated for 1 hour at 150° C. with 32 grams sodium oxide and the mixture subsequently condensed for 1 hour at 150° C. with 103 grams α-ethylhexylchloracetate and finally steam-distilled yielded 409 grams recovered α-ethylhexanol and 100 grams crude α-ethylhexyloxyacetic acid which upon distillation in vacuo yielded 72 grams of refined acid (76 per cent. of theory). Colorless oil boiling at 135–145° C./2 mm. and posessing a characteristic goat odor.

Example 3

*Benzyloxyacetic acid*

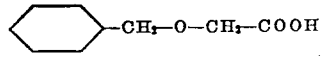

Using the same procedure as given in Example 1, 37 grams of sodium oxide were suspended in 332 grams of benzyl alcohol. The temperature rose spontaneously to 75° after which the mixture was heated to 130° and held at that temperature for 1 hour. It was then cooled to 75° C. and 93 grams of benzylchloracetate were added. The temperature rose to 143° and was then held for 1 hour at 130°. The resulting mixture was steam-distilled to remove the excess alcohol and to saponify the ester formed. The distilled residue was acidified with 10 per cent. sulfuric acid and the resulting crude benzyloxyacetic acid was distilled in a vacuum. 59 grams of the pure product or 71 per cent. of theory was obtained. It is a colorless liquid boiling at 147–152° C./2 mm. and which crystallizes on standing.

In the foregoing examples the alcohol radical of the ester of the chlorinated acid chosen was the same as the alcohol used for making the sodium alcoholate. This is not necessary for the successful operation of the present invention but was merely done as a matter of convenience so that on recovering the alcohol it would not be necessary to separate two or more alcohols which would have been the case if an alcohol different from that of the alcoholate had been chosen to make the ester of the chlorinated acid.

In place of the chloracetic acid esters given by way of illustration above, molecularly equivalent quantities of chloropropionic, chlorbutyric, chlorisobutyric, chlorosuccinic, chlorolauric acids etc. can be used.

The temperature and time of the reaction can be varied within wide limits depending upon the size of the batch and the rate of stirring. In order to attain good yields, the alcohols or esters used should be as nearly anhydrous as possible.

The reaction is especially valuable for converting aliphatic, aromatic or cycloaliphatic alcohols containing more than three carbon atoms into the corresponding acids of the type

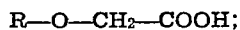

especially for converting the higher alcohols such as hexyl, cyclohexyl, heptyl, octyl, nonyl, decyl or benzyl alcohols which do not react readily with sodium hydroxide to form alcoholates and which can only be practically converted to alcoholates by means of an alkali metal.

I claim:

1. The process for preparing ether acids which comprises treating an anhydrous mono-hydric alcohol with an alkali metal monoxide to form a solution of the alkali metal alcoholate containing the hydroxide of the alkali metal, adding an anhydrous neutral ester of a halogenated carboxylic acid to said solution and heating to simultaneously condense said ester with said alcoholate and saponify the resulting ether acid ester.

2. The process for preparing ether acids which comprises treating an anhydrous mono-hydric alcohol with sodium oxide to form a solution of sodium alcoholate containing sodium hydroxide, adding an anhydrous neutral ester of a halogenated carboxylic acid to said solution and heating to simultaneously condense said ester with said alcoholate and saponify the resulting ether acid ester.

3. The process of preparing alkoxy-aliphatic carboxylic acids which comprises treating an anhydrous mono-hydric aliphatic alcohol with an alkali metal monoxide to form a solution of the alkali metal alcoholate containing the hydroxide of the alkali metal, adding an anhydrous neutral ester of a halogenated carboxylic acid to said solution and heating to simultaneously condense said ester with said alcoholate and saponify the resulting ester of the alkoxy-aliphatic carboxylic acid.

4. The process of preparing alkoxy-acetic acids which comprises treating an anhydrous mono-hydric alcohol with sodium oxide to form a solution of the sodium alcoholate containing sodium hydroxide, adding an anhydrous neutral ester of chloracetic acid to said solution and heating to simultaneously condense said ester with said sodium alcoholate and saponify the resulting ester of the alkoxy-acetic acid.

5. The process of preparing acids of the formula

wherein R is a hydrocarbon radical of an alcohol containing more than three carbon atoms; which comprises treating said alcohol in anhydrous condition with sodium oxide to form a solution of the sodium alcoholate containing sodium hydroxide, adding an anhydrous neutral ester of monochloracetic acid to said solution, heating the mixture to split out sodium chloride and saponify the ester, removing the excess of the alcohol and acidifying the resulting solution.

6. The process of preparing an octyloxyacetic acid which comprises heating an anhydrous octyl alcohol with sodium oxide, heating the resulting mixture with the neutral anhydrous monochloracetate of an octyl alcohol, removing the octyl alcohol and acidifying the mixture.

HERMAN A. BRUSON.